United States Patent
Xu

(10) Patent No.: US 10,046,460 B2
(45) Date of Patent: Aug. 14, 2018

(54) ROBOT TEACHING POSITION CORRECTING METHOD AND SYSTEM

(71) Applicant: BEIJING NAURA MICROELECTRONICS EQUIPMENT CO., LTD., Beijing (CN)

(72) Inventor: Dong Xu, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 137 days.

(21) Appl. No.: 15/281,115

(22) Filed: Sep. 30, 2016

(65) Prior Publication Data

US 2017/0190053 A1   Jul. 6, 2017

(30) Foreign Application Priority Data

Dec. 31, 2015   (CN) .......................... 2015 1 1022415

(51) Int. Cl.
   *G06F 19/00*   (2018.01)
   *B25J 9/16*   (2006.01)
   *B25J 11/00*   (2006.01)

(52) U.S. Cl.
   CPC .......... *B25J 9/1692* (2013.01); *B25J 11/0095* (2013.01); *G05B 2219/39024* (2013.01)

(58) Field of Classification Search
   CPC ................ B25J 9/1692; B25J 11/0095; G05B 2219/39024
   See application file for complete search history.

(56) References Cited

U.S. PATENT DOCUMENTS

| | | | |
|---|---|---|---|
| 6,215,127 B1 * | 4/2001 | Yu | G03F 7/70625 250/398 |
| 6,343,242 B1 * | 1/2002 | Nomura | B25J 9/1676 318/568.11 |
| 6,345,209 B1 * | 2/2002 | Yu | G03F 7/70516 430/5 |
| 6,345,211 B1 * | 2/2002 | Yu | G03F 7/70516 430/5 |
| 6,360,144 B1 * | 3/2002 | Bacchi | B25J 9/042 414/744.3 |

* cited by examiner

*Primary Examiner* — Mingjen Jen
(74) *Attorney, Agent, or Firm* — Tianchen LLC

(57) ABSTRACT

A robot teaching position correcting method and system is provided. The robot is driven to move along wafer pick-and-place operation paths defined by a sequence of waypoints. Distances between the waypoint and a wafer supporter of the wafer carrier above the waypoint are detected by upper sensors provided on a top surface of the robot when the robot is positioned at the waypoint. Then, the position parameter of the waypoint is corrected accordingly, so as to ensure safe wafer handling.

19 Claims, 11 Drawing Sheets

ROBOT TEACHING POSITION CORRECTING METHOD AND SYSTEM

CROSS-REFERENCE TO RELATED APPLICATION

The application is related to and claims the priority benefit of Chinese Patent Application Serial No. 201511022415.X, filed Dec. 31, 2015; the entirety of each of the above-mentioned patent applications is hereby incorporated by reference herein and made a part of the specification.

FIELD OF THE INVENTION

The present invention generally relates to the field of semiconductor manufacturing equipment, more particularly, to a method and system for robot teaching position correction.

BACKGROUND OF THE INVENTION

Safe wafer pick-and-place is a very important technical indicator for integrated circuit production lines. Generally, the breakage rate of wafers in the course of production due to wafer handling equipment should be less than 0.001%. Compared with a single-wafer processing system, a batch-type wafer heat treatment system requires more wafer transfer and pick-and-place operations in each production process, which makes higher demands of safe and reliable wafer transfer and pick-and-place.

Nowadays, robots have been widely applied in the field of semiconductor IC manufacturing technology and have become important tools in wafer handling systems for picking, placing and transferring unprocessed and processed wafers. The robot can response to instructions to accurate move to a point of wafer location in a three-dimensional or two-dimensional space to pick and place wafers.

Currently, the positional parameters of the robot during wafer handling in the batch-type wafer heat treatment equipment are generally obtained by offline teaching. The robot uses its fork to perform the pick-and-place operations to the wafers located in a wafer carrier according to the stored robot teaching data. However, factors such as equipment error, load variations or temperature variations may cause collision of the robot fork with the wafer or wafer carrier when the robot performs the pick-and-place operations, resulting in irreparable losses such as damages to the wafer or equipment.

Accordingly, in order to perform safe wafer pick-and-place operations, there is a need to calibrate or correct the offline teaching positions of the robot periodically.

BRIEF SUMMARY OF THE DISCLOSURE

In order to overcome the drawbacks mentioned above, the present invention provides a robot teaching position correcting method and system, which can fast and accurate correct the positional parameters of the robot teaching data, so as to ensure safe wafer pick-and-place operations.

According to one aspect of the present invention, a robot teaching position correcting method is provided. The robot comprises a fork for picking up and placing target wafers on supporters in a wafer carrier. The fork is mounted on a fixed base station. The correcting method comprises:

Step S1: offline obtaining robot teaching data including position parameters of a sequence of waypoints which define pick-up operation paths or place operation paths of the target wafers;

Step S2: providing at least three non-linear arranged upper sensors on a top surface of the fork or a top surface of a dummy wafer fixed on the fork;

Step S3: driving the robot to move along the pick-up operation path or the place operation path of each target wafer, and at each waypoint driving the upper sensors to detect distances between the waypoint and an adjacent supporter above the waypoint;

Step S4: at each waypoint, correcting a position parameter of the waypoint according to the distances detected by the upper sensors.

According to another aspect of the present invention, a robot teaching position correcting system is provided. The robot has a fork mounted on a fixed base station for picking up and placing targets wafer on supporters in a wafer carrier. The system comprises at least three non-linear arranged upper sensors provided on a top surface of the fork or a top surface of a dummy wafer can be fixed on the fork; a store module storing robot teaching data including position parameters of a sequence of waypoints which define pick-up operation paths or place operation paths of the target wafers; a drive module driving the robot to move along the pick-up operation path or the place operation path of each target wafer and at each waypoint driving the upper sensors to detect distances between the waypoint and an adjacent supporter above the waypoint; and a correct module correcting a position parameter of each waypoint according to the distances detected by the upper sensors.

According to the present invention, during the motion of the robot, the distance between the fork of the robot and the supporter is detected by the upper sensor arranged on the fork, by which the robot teaching data associated with the height of the fork can be corrected on-line or offline. Therefore, wafer damages due to unexpected contact between the fork and the wafer can be avoided, and wafer handling safety can be improved.

DETAILED DESCRIPTION OF THE EMBODIMENTS

Reference will now be made in detail to the present preferred embodiments to provide a further understanding of the invention. The specific embodiments and the accompanying drawings discussed are merely illustrative of specific ways to make and use the invention, and do not limit the scope of the invention or the appended claims.

Figure 1:
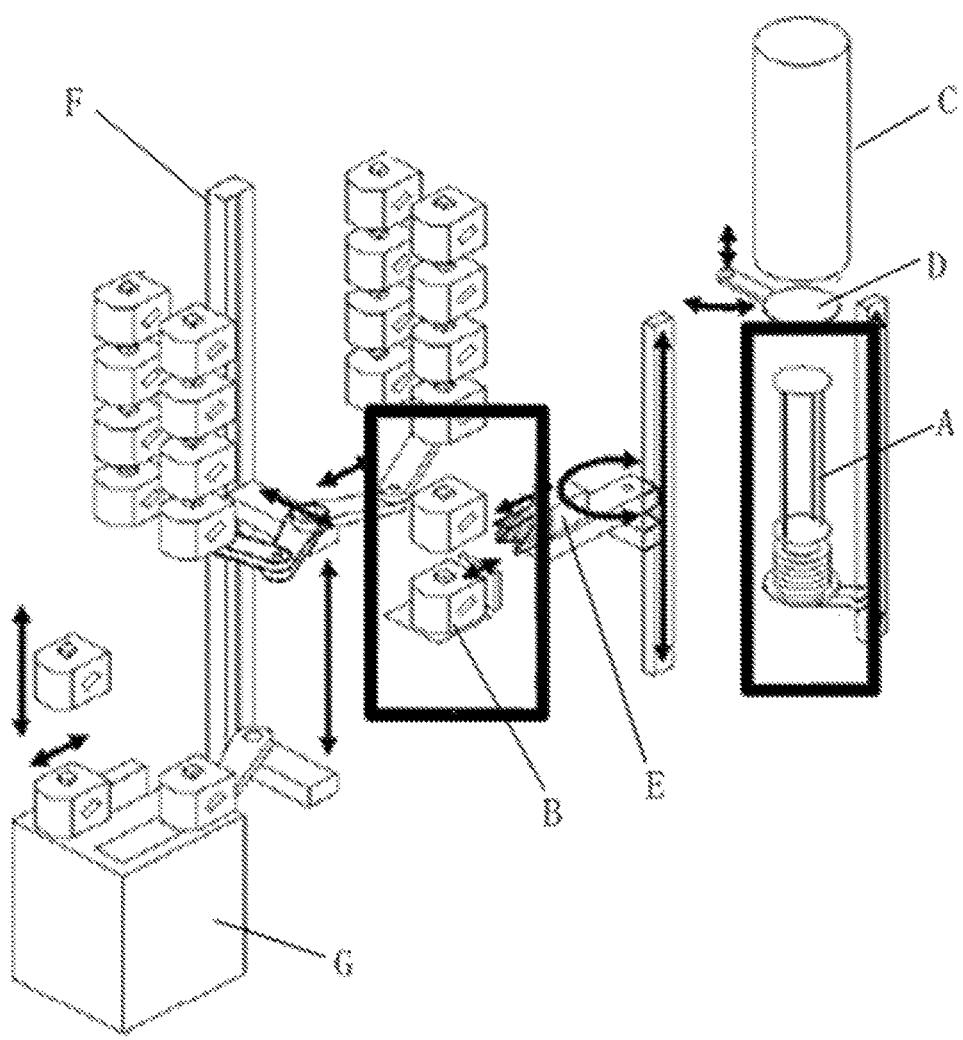
FIG. 1 is a view illustrating different wafer carriers in the semiconductor equipment according to an embodiment of the present invention.

The semiconductor equipment of the present invention includes a wafer carrier which supports multiple wafers and a robot which performs the wafer pick-and-up operations. The wafer carrier has supporters on which the wafers are horizontally positioned in a vertical stack. As shown in FIG. 1, in an embodiment of the present invention, the wafer carrier can be a front-opening unified pod (FOUP) B which stores the wafers. It can also be a wafer boat A which loads the wafers into a reaction chamber C. The semiconductor equipment further has a FOUP holder F for holding the FOUPs B, which is connected to a pedestal G. During wafer handling, the robot E picks up the wafers from the FOUP B and places them on the wafer boat A. After the wafers being loaded into the wafer boat, a furnace door D at the bottom of the reaction chamber C is opened and the wafer boat A carrying the wafers is ascended into the reaction chamber C. When the reaction is completed, the furnace door D is opened, the wafer boat A carrying the processed wafer is descended from the bottom of the reaction chamber C, and then the robot E picks up the wafers from the wafer boat A and places them into the FOUP B. Wherein, the movement directions of the components A, B, D, E mentioned above are indicated by arrows as shown in FIG. 1. Therefore, as for the wafer pick-up operation of the present invention, the wafers are taken out from either the FOUP or the wafer boat. Similarly, as for the wafer place operation, the wafers are placed into either the FOUP or the wafer boat.

In order to perform safe wafer pick-and-place operations, the robot teaching data which teaches the motion of the robot should be calibrated and corrected. The robot teaching position correcting method and system according to the present invention will be described in details hereinafter in conjunction with FIGS. 2-13 and embodiments. The figures referred to above are in simplified forms and not necessarily drawn to scale, should be understood to provide a representation of particular embodiments of the invention, and are merely conceptual in nature and illustrative of the principle involved.

First Embodiment

Figure 2:
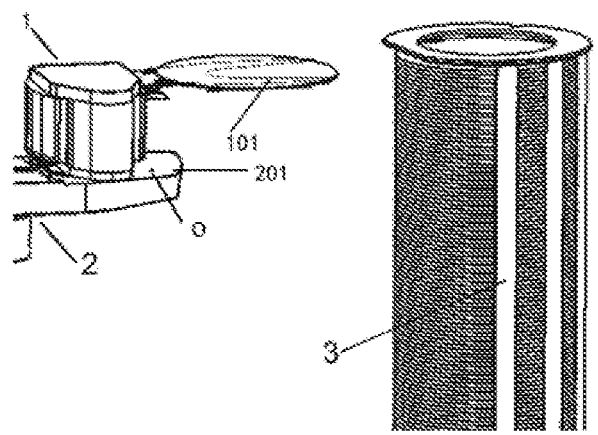
FIG. 2 is a view illustrating positions of the robot fork and the robot base station according to an embodiment of the present invention.
Figure 3:
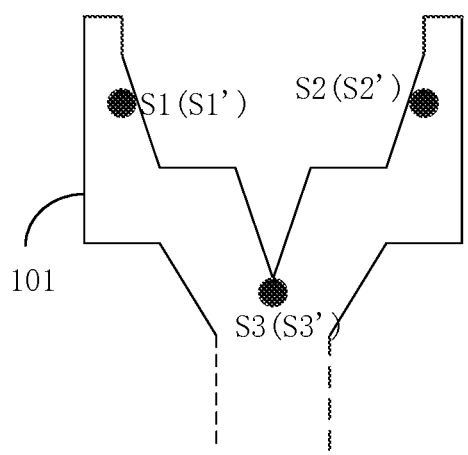
FIG. 3 is a bottom view illustrating the robot fork according to an embodiment of the present invention.

Referring to FIG. 2 and FIG. 3, in the embodiment, the wafer carrier is a wafer boat including a plurality of (for example, three) supporting columns 3 which are separated from and in parallel to each other in the semi-circumference of the wafer W, and supporters arranged on each of the columns at a predetermined vertical interval extending inward for holding edge portions of the wafers from below. The fork 101 of the robot 1 is mounted on a fixed robot base station 2, for picking up and placing wafers in the wafer carrier.

Figure 5:
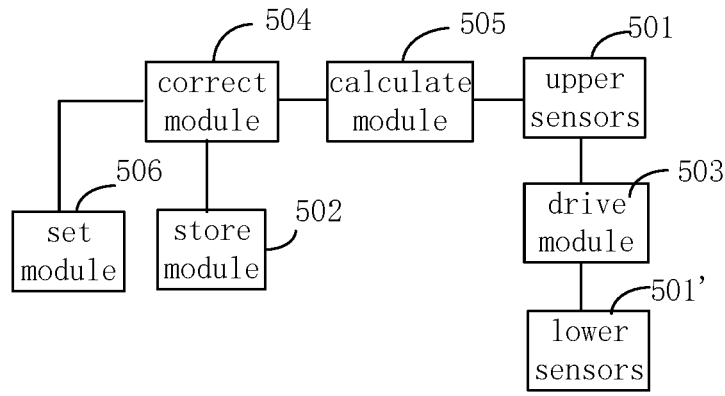
FIG. 5 is a block diagram of the robot teaching position correcting system according to an embodiment of the present invention.
Figure 6:
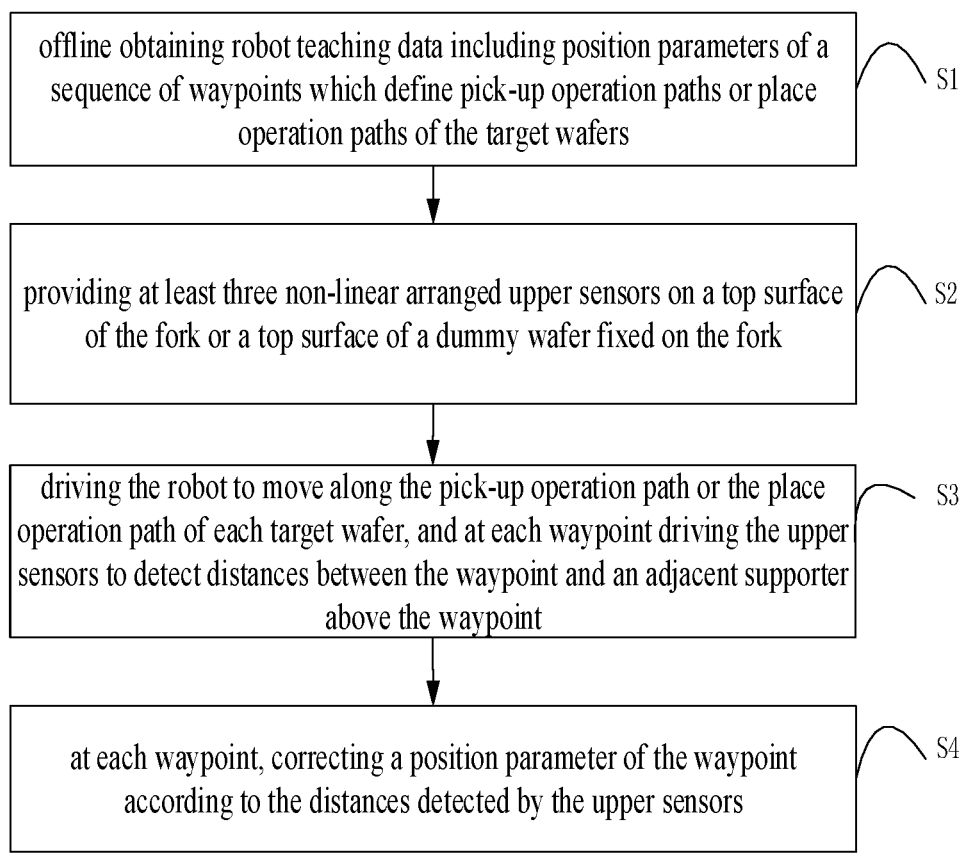
FIG. 6 is a flow chart illustrating the robot teaching position correcting method according to an embodiment of the present invention.

As shown in FIG. 5 and FIG. 6, the robot teaching position correcting system comprises: at least three non-linear arranged upper sensors 501 fixed on a top surface of the fork, a store module 502, a drive module 503, a correct module 504, a calculate module 505. The correcting method of the present embodiment will be described in detail as follows.

Firstly, the robot teaching data is obtained offline. The robot teaching data offline acquisition method will be described later.

The store module 502 stores the obtained robot teaching data which teaches the motion of the robot. The robot teaching data includes position parameters of a sequence of waypoints which define pick-up and place operation paths of the target wafers.

Figure 4A:
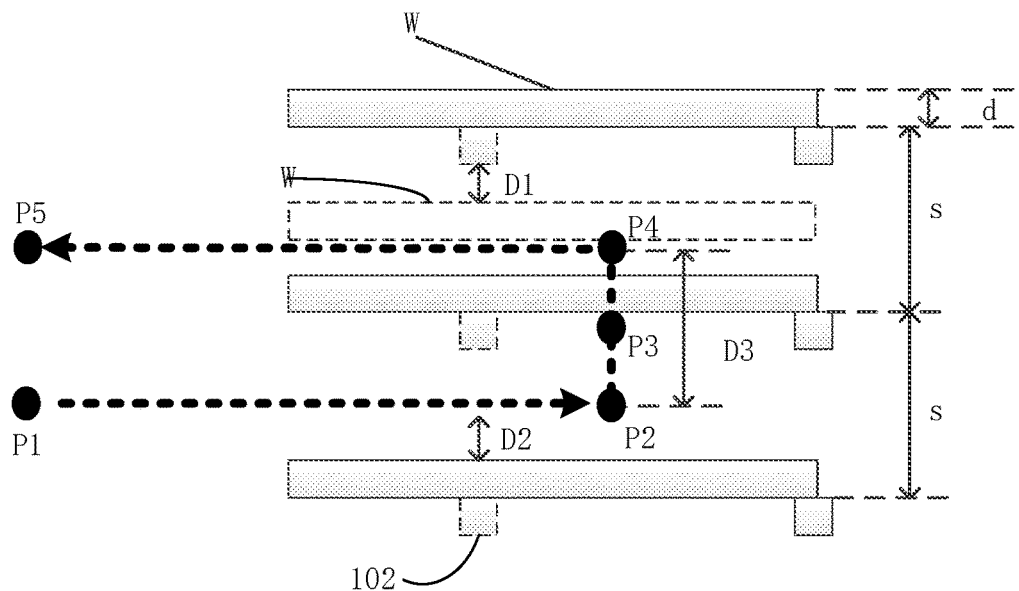
FIG. 4a is a view illustrating a wafer pick-up path according to an embodiment of the present invention.

FIG. 4a is a view illustrating a pick-up operation path of a target wafer. Herein, the term "target wafer" means a wafer to be picked-up or placed. According to the embodiment, the robot performs the wafer pick-up operation along a pick-up operation path as represented by the thick dotted line of FIG. 4a passing through five waypoints P1-P5 successively. Herein, the waypoint P1 represents a first position at which the robot is ready to enter into the wafer carrier, the waypoint P2 represents a second position right below the target wafer at which the robot is ready to touch the target wafer. The waypoints P1 and P2 are in the same level at a height of "D2" relative to the plane of an underlying wafer, the distance between the waypoint P1 and the wafer carrier is preferably to be greater than twice the vertical interval "S" between the supporters. The waypoint P3 represents a third position at which the robot touches the target wafer and picks it up from the wafer carrier, the waypoint P4 represents a fourth position right above the third position P3 at which the robot holds the target wafer and is ready to leave the wafer carrier, the waypoint P5 represents a fifth position outside the wafer carrier at which the robot finishes the pick-up operation. The distance between the waypoint P5 and the wafer carrier is preferably to be greater than twice the vertical interval "S" between the supporters. The waypoints P4 and P5 are in the same level at a height of "D3" relative to the waypoints P1 and P2 where the distance between the target wafer hold thereon and an above supporter is "D1". The store module 502 stores the position parameters of the waypoints P1-P5, including the parameters D1, D2 and D3, as well as other robot teaching data including the thickness "d" of the target wafer, the vertical interval "S" between the supporters, and the thickness "t" of the supporter. These waypoints teach the robot to perform the pick-up operation as follows: firstly, the robot moves horizontally from the initial position of the waypoint P1 to the waypoint P2, then moves vertically upward to the waypoint P3 and picks up the target wafer, the robot continues to move upward with the target wafer to the waypoint P4, and finally moves horizontally from the waypoint P4 the end position of the waypoint P5.

Figure 4B:
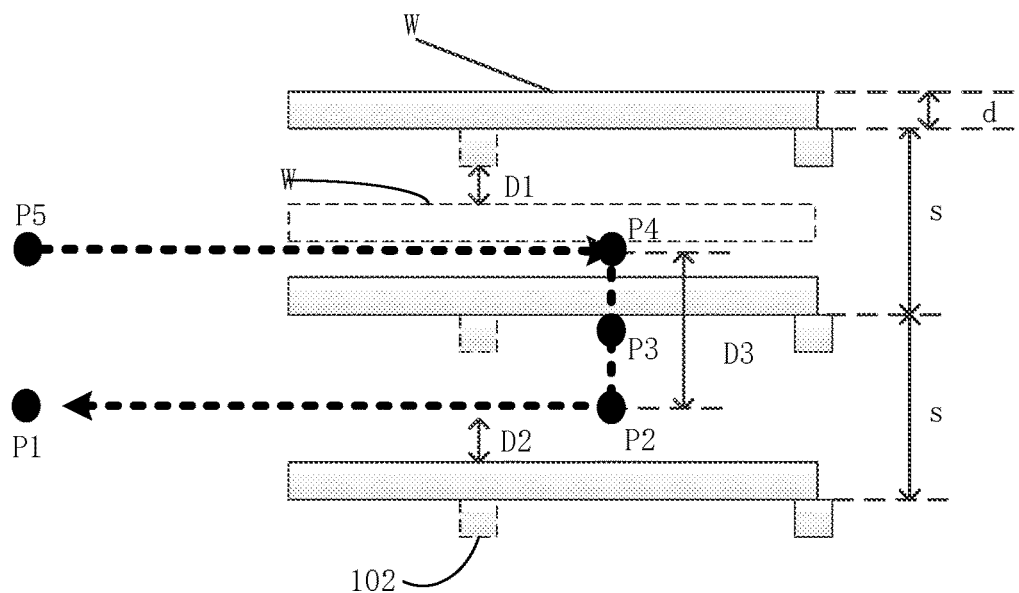
FIG. 4b is a view illustrating a wafer place path according to an embodiment of the present invention.

FIG. 4b is a view illustrating the place operation path of the target wafer. According to the embodiment, the robot performs the wafer place operation along a place operation path as represented by the thick dotted line of FIG. 4b passing through five waypoints P5-P1 successively. The place operation path is opposite to the pick-and-place path. Herein, the waypoint P5 represents a first position at which the robot carrying the target wafer is ready to enter into the wafer carrier, the waypoint P4 represents a second position right above a target position for accommodating the target wafer at which the robot is ready to place the target wafer. The distance between the waypoint P5 and the wafer carrier is preferably to be greater than twice the vertical interval "S" between the supporters. The waypoints P4 and P5 are in the same level at a height that the distance between the target wafer and an adjacent above supporter is "D1". The waypoint P3 represents a third position at which the robot places the target wafer on the supporters, the waypoint P2 represents a fourth position right below the third position P3 at which the robot is ready to leave the wafer carrier, the waypoint P1 represents a fifth position outside the wafer carrier at which the robot finishes the place operation. The waypoints P2 and P1 are in the same level at a height of "D2" relative to the plane of a wafer below the fork with a vertical distance of "D3" to the waypoints P5 and P4. The distance between the waypoint P1 and the wafer carrier is preferably to be greater than twice the vertical interval "S" between the supporters. The store module 502 stores the position parameters of the waypoints P5-P1, including the parameters D1-D3 for the wafer place operation, as well as other robot teaching data including the thickness "d" of the target wafer, the vertical interval "S" between the supporters, and the thickness "t" of the supporter. Accordingly, these waypoints teach the robot to perform the place operation as follows: firstly, the robot moves horizontally from the initial position of the waypoint P5 to the waypoint P4, then moves vertically downward to the waypoint P3 and places the target wafer on the supporters, the robot continues to move downward without the target wafer to the waypoint P2, and finally moves horizontally from the waypoint P2 to the end position of the waypoint P1. It is noted that, although in the embodiment, the position parameters of the waypoints P1 to P5 in the pick-up path and the place path of a same target wafer are the same, they can also be different and respectively stored in the store module 502.

Then, the robot is actuated to move along the operation paths according to the robot teaching data by the drive module 503. The drive module 503 also drives the upper sensors 501 to detect distances to an adjacent above supporter when the robot arrives at each waypoint in the pick-up operation paths and place operation paths of the target wafer.

As shown in FIG. 3, in the embodiment, three upper sensors S1, S2, S3 (indicated by black spots) are arranged on the top surface of the fork 101 of the robot. The sensors S1 and S2 are respectively arranged on the two symmetrical wings of the V-shaped fork 101 and the sensor S3 is arranged on a vertex of the V-shaped fork 101. The connections line of the sensors S1, S2 is vertical to a symmetrical axis Y' of the fork 101. In the embodiment, the upper sensors S1-S3 are optical sensors which detects the distances to a same supporter above a current waypoint by the drive module when the robot is positioned at the current waypoint. Specifically, each of the optical sensors S1-S3 is capable to emit lights in different orientations, once a light emitted at a certain angle passes through the supporter, the optical sensor detects the distance to the supporter. In other embodiments, when the robot fork is not suitable for mounting sensors, a dummy wafer can be provided on a top surface of the fork instead. In this case, the upper sensors can be fixed on a top surface of the dummy wafer, and the correction should be performed offline.

Then, the correct module 504 corrects the position parameters of the waypoints according to the distances detected by the upper sensors. Specifically, since the distance between each upper sensor and one adjacent supporter above the upper sensors as well as the direction of the light emitted by each upper sensor are both obtained, the calculate module 505 calculates vertical distances between the upper sensors and a horizontal plane of the adjacent supporters above the upper sensors accordingly. The calculate module 505 further calculates an average value of the vertical distances between the upper sensors and the horizontal plane of the supporters, as well as a variation between the average value and a reference vertical distance corresponding to the waypoint. The reference vertical distance corresponding to the waypoint is a distance between the waypoint and the horizontal plane of the adjacent supporters above the waypoint, which is also a position parameter of the waypoint that stored in the store module 502. The correct module 504 corrects the robot teaching data associated with the height of the waypoint which is stored in the store module 502. For example, the correct module 504 modifies the parameter S2 to be $S2'=S2-Z_{change}$.

It is noted that, the above correcting method can be performed either offline or on-line. When it is performed on-line, the upper sensors 501 are arranged on the top surface of the fork at regions not covered by the target wafer. Furthermore, the height of the fork can be calibrated meanwhile and the robot can be actuated to move according to the corrected robot teaching data.

The following will describe in detail how to offline obtain the robot teaching data before the robot teaching data correction.

As shown in FIG. 5, in the embodiment, the correcting system further comprises at least one lower sensor 501' fixed on a bottom surface of the fork, and a set module 506. The robot teaching data acquisition method comprises the following steps.

Firstly, referring to FIG. 2, a detection point O is set on a horizontal upper surface 201 of the base station. Since the position of the horizontal upper surface 201 is fixed, a reference coordinate system can be established in which the detection point O is a zero point and the horizontal upper surface 201 is an XOY plane.

Then, the set module 506 sets initial robot teaching data. The initial robot teaching data at least includes coordinate values of the waypoints in the reference coordinate system which define pick-up operation paths and place operation paths of a top wafer and a bottom wafer in the wafer carrier. After setting the coordinate values of the waypoints in the top and bottom pick-up/place operation paths, waypoint positions in other pick-up/place operation paths in the wafer carrier can also be calculated automatically.

Then, the drive module 503 actuates the robot to move in accordance with the initial robot teaching data and drives the lower sensor 501' to detect a distance to the detection point O at least when the robot arrives at each waypoint.

In the case where the fork is tilted, the distance to the detection point detected by one lower sensor may cause error in fork height. In the embodiment, in order to increase the detection accuracy, three lower sensors S1', S2', S3' are arranged on the bottom surface of the fork 101, distances detected by the lower sensors are averaged to obtain the vertical distance between the fork and the horizontal upper surface. In other embodiments, when the robot fork is not suitable for mounting sensors, a dummy wafer can be provided on a top surface of the fork instead. In this case, the lower sensor(s) can be fixed on a bottom surface of the dummy wafer at regions not covered by the fork. In the embodiment, the lower sensors S1'-S3' are optical sensors which are driven by the drive module 503 to detect distances to the detection point O at least when the robot is positioned at each waypoint in the operation paths of the top wafer and the bottom wafer. Specifically, each of the optical sensors S1'-S3' is capable to emit lights in different orientations, once a light emitted at a certain angle passes through the detection point, the optical sensor detects the distance to the detection point A.

Each time after the lower sensors detect the distances, the calculate module 505 calculates a vertical distance between the fork and the horizontal upper surface of the base station at the waypoint. For example, at waypoint Pi, since the distance between each lower sensor and the detection point as well as the direction of the light emitted by the lower sensor are both obtained, the calculate module 505 calculates spatial coordinates of the three lower sensors in the reference coordinate system as $(x_1, y_1, z_1)$, $(x_2, y_2, z_2)$ and $(x_3, y_3, z_3)$ at the waypoint Pi. The calculate module 505 further calculates an average value of the distances between the lower sensors and the horizontal upper surface (that is, the Z positions of the lower sensors) Zave=Average $(z_1, z_2, z_3)$ as the vertical distance between the fork and the horizontal upper surface at the waypoint Pi.

Finally, the correct module 504 corrects the coordinate values of the waypoint position according to the distance between the fork and the horizontal upper surface. Specifically, at waypoint Pi, the correct module 504 obtains a difference value $Z_{change}$ of the distance Zave and an initial Z position Zpi of the waypoint Pi which is one of the initial robot teaching data, the difference value $Z_{change}$ meets the relationship of $Z_{change}$=Zave−Zpi. Then, the correct module 504 corrects the Z position of the waypoint Pi to be Zpi'=Zpi−$Z_{change}$. The correct module 504 also stores the corrected robot teaching data into the store module 506 as the related robot teaching data.

Preferably, when offline obtaining the robot teaching data, the motion of the robot simulates the actual wafer pick-and-place operations to the whole wafer carrier, that is, the robot picks up wafers in an order from bottom to top while places wafers in an order from top to bottom. Therefore, when offline obtaining the robot teaching data associated with the waypoints in the pick-up operation path and the place operation path of the top wafer, only the top location in the wafer carrier is loaded with a wafer; when offline obtaining the robot teaching data associated with the waypoints in the pick-up operation path and the place operation path of the bottom wafer, all locations in the wafer carrier are full-loaded with wafers.

Second Embodiment

However, during the actual wafer pick-and-place operations, variations in load may affect the position or pose of the wafers. Accordingly, load variation is preferred to be considered when offline obtaining robot teaching data. In the embodiment, a real load variation status of the wafer carrier that occurred in the actual wafer pick-and-place operations is simulated in the offline robot teaching data acquisition and the initial robot teaching data are calibrated based on such load variation status.

In the embodiment, the robot teaching data acquisition method comprises the following steps.

Firstly, a detection point O is set on a horizontal upper surface 201 of the base station. A reference coordinate system in which the detection point O being zero point and the horizontal upper surface 201 being an XOY plane is established.

Then, the wafer carrier is divided into multiple zones from top to down. In the embodiment, the wafer carrier is divided into three zones $Z_A$, $Z_B$ and $Z_C$.

Figure 7:
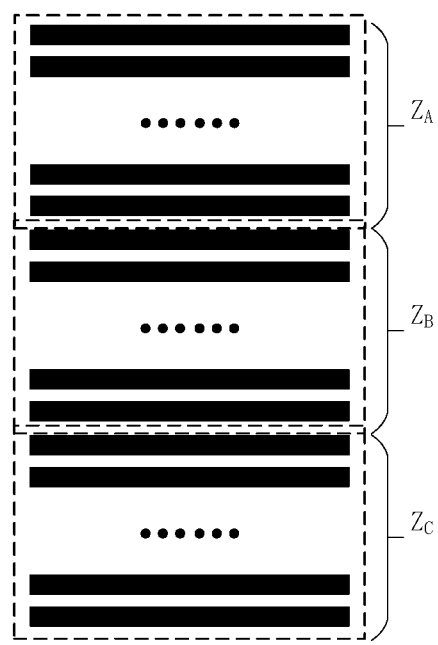
FIG. 7 is a view illustrating a wafer carrier according to another embodiment of the present invention.

The set module 506 sets initial robot teaching data of each zone which teaches the motion of the robot in the zone. The initial robot teaching data includes coordinate values of a plurality of waypoints in the reference coordinate system which define operation paths for the robot to pick-up/place a top wafer and a bottom wafer in each zone. After setting position parameters of waypoints in the top and bottom pick-up/place operation paths, waypoint positions in other pick-up/place operation paths in the same zone can also be determined automatically. Referring to FIG. 7, the upper zone $Z_A$ of the wafer carrier accommodates wafers 1 to 50, the middle zone $Z_B$ accommodates wafers 51 to 100, the lower zone $Z_C$ accommodates wafers 101 to 150. The set module 506 sets the initial robot teaching data associated with the position of each waypoint in the operation paths of the $1^{st}$, $50^{th}$, $51^{st}$, $100^{th}$, $101^{st}$, $150^{th}$ wafers in the wafer carrier.

Then the drive module 503 drives the robot to move along the operation paths according to the initial robot teaching data when the zones are under different load status including unload and/or full-load and drives the lower sensors to detect distances to the detection point when the robot arrives at each waypoint in the operation paths of the top wafer and the bottom wafer of each zone. Each time after the lower sensors detecting the distances, the calculate module 505 calculates a vertical distance between the fork and the horizontal upper surface of the base station at the waypoint, and the correct module 504 corrects the initial robot teaching data associated with the position of the waypoint according to the vertical distance and stores the corrected initial robot teaching data into the store module 506 as the related robot teaching data. Herein, the term "unload" means that only the top location and the bottom location of the zone are loaded with wafers while other locations are empty. The term "full-loaded" means that all the locations in the zone are loaded with wafers. Since the positions of the waypoints in the operation paths of the top wafer and bottom wafer in the zone are determined, positions of the waypoints in the operation paths of other wafers in the same zone can be calculated by the calculate module automatically and the drive module can drive the robot to move along all the operation paths in the zone in sequence. Generally, the robot performs the pick-up operations in an order from bottom to top and performs the place operations in an order from top to bottom. Such different operation sequence may result in different load status in the wafer carrier during the pick-up operation and the place operation, therefore, the initial robot teaching data associated with the pick-up operation paths and the place operation paths should be calibrated respectively. Furthermore, when obtaining the robot teaching data in different zones for the pick-up operation or the place operation, the temperature of these zones should be kept consistent to prevent effects of temperature variation on the robot teaching data.

Figure 8A:
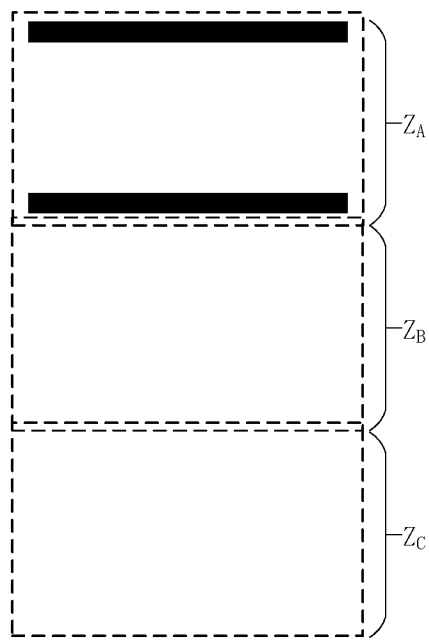
FIGS. 8a and 8b are views illustrating offline obtaining robot teaching data associated with waypoints in wafer pick-up operation paths in the upper zone of the wafer carrier according to another embodiment of the present invention.
Figure 8B:
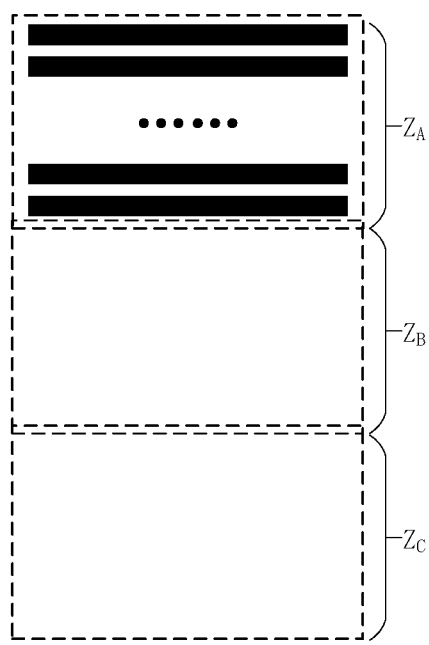

Please referring to FIG. 8a, when obtaining the robot teaching data associated with the place operation paths, the initial positions of the waypoints in the place paths of the upper zone are firstly calibrated. Specifically, when the upper zone $Z_A$ is unloaded and the middle and lower zones $Z_B$, $Z_C$ are empty, the drive module 503 drives the robot to move along the place path of the 1$^{st}$ wafer, and drives the lower sensors to detect distances to the detection point at waypoint Pi (i=1, 2, 3, 4, 5). The calculate module 505 calculates the vertical distance $Zi_{A1unload}$ between the fork and the horizontal upper surface accordingly. Then the drive module drives the robot to move along the place path of the 50$^{th}$ wafer, and drives the lower sensors to detect distances to the detection point at waypoint Pi. The calculate module 505 calculates the vertical distance $Zi_{A50unload}$ between the fork and the horizontal upper surface accordingly. As shown in FIG. 8b, when the upper zone $Z_A$ is loaded and the middle and lower zones $Z_B$, $Z_C$ are empty, the drive module 503 again drives the robot to move along the place paths of the 1$^{st}$ wafer and the 50$^{th}$ wafer, the calculate module 505 respectively calculates the vertical distances between the fork and the horizontal upper surface at waypoint Pi in the place paths of the 1$^{st}$ wafer and the 50$^{th}$ wafer as $Zi_{A1load}$ and $Zi_{A50load}$ according to detection results of the lower sensors. Then, the calculate module 505 acquires a first average distance $Zi_{A1}$ of the vertical distances between the fork and the horizontal upper surface at the same waypoint Pi in the place path of the 1$^{st}$ wafer when the upper zone $Z_A$ is unloaded and loaded, the first average distance can be represented as $Zi_{A1}=(Zi_{A1unload}+Zi_{A1load})/2$. The correct module 504 corrects the initial robot teaching data $Zpi_{A1}$ to be $Zpi_{A1}'=Zpi_{A1}-Z_{A1change}$, wherein $Z_{A1change}=Zi_{A1}-Zpi_{A1}$. Similarly, the calculate module 505 acquires a second average distance $Zi_{A50}$ of the vertical distances between the fork and the horizontal upper surface at the same waypoint Pi in the place path of the 50$^{th}$ wafer when the upper zone $Z_A$ is unloaded and loaded, the second average distance can be represented as $Zi_{A50}=(Zi_{A50unload}+Zi_{A50load})/2$. The correct module 504 corrects the initial robot teaching data $Zpi_{A50}$ to be $Zpi_{A50}'=Zpi_{A50}-Z_{A50change}$, wherein $Z_{A50change}=Zi_{A50}-Zpi_{A50}$. The store module 502 stores the corrected initial robot teaching data $Zpi_{A1}'$ and $Zpi_{A50}'$.

Figure 9A:
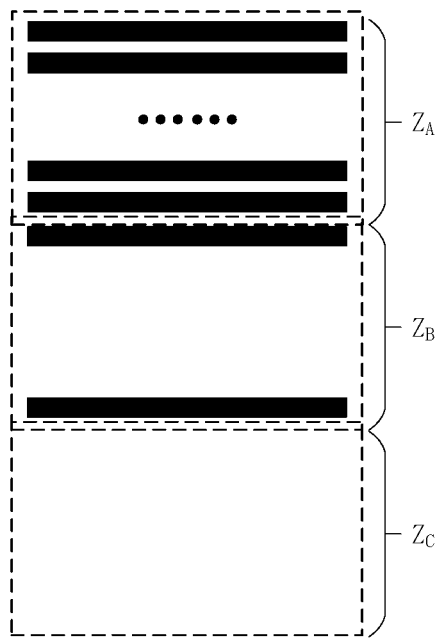
FIGS. 9a and 9b are views illustrating offline obtaining robot teaching data associated with waypoints of wafer pick-up operation paths in the middle zone of the wafer carrier according to another embodiment of the present invention.
Figure 9B:
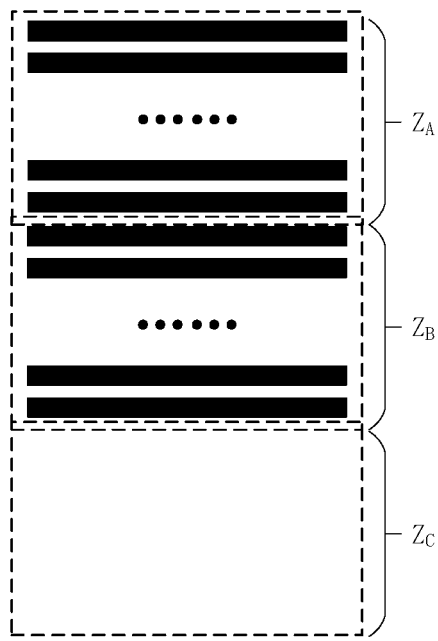

Then the initial positions of the waypoints in the place paths of the middle zone $Z_B$ are calibrated. As shown in FIG. 9a, when the upper zone $Z_A$ is loaded, the middle zone $Z_B$ is unloaded and the lower zone $Z_C$ is empty, the drive module 503 drives the robot to move along the place path of the 51$^{st}$ wafer, and drives the lower sensors to detect distances to the detection point at waypoint Pi. The calculate module 505 calculates the vertical distance $Zi_{B51unload}$ between the fork and the horizontal upper surface accordingly. Then the drive module 503 drives the robot to move along the place path of the 100$^{th}$ wafer, and drives the lower sensors to detect distances to the detection point at waypoint Pi. The calculate module 505 calculates the vertical distance $Zi_{B100unload}$ between the fork and the horizontal upper surface accordingly. As shown in FIG. 9b, when the upper zone $Z_A$ and the middle zone $Z_B$ are loaded and the lower zone is empty, the drive module 503 again drives the robot to move along the place path of the 51$^{st}$ wafer and the 100$^{th}$ wafer, the calculate module 505 respectively calculates the vertical distances between the fork and the horizontal upper surface at waypoint Pi in the place path of the 51$^{st}$ wafer and the 100$^{th}$ wafer as $Zi_{B51load}$ and $Zi_{B100load}$ according to detection results of the lower sensors. Then, the calculate modules acquires a first average distance $Zi_{B51}$ of the vertical distances between the fork and the horizontal upper surface at the same waypoint Pi in the place path of the 51$^{st}$ wafer when the upper zone $Z_B$ is unloaded and loaded, the first average distance can be represented as $Zi_{B51}=(Zi_{B51unload}+Zi_{B51load})/2$. The correct module 504 corrects the initial robot teaching data $Zpi_{B51}$ to be $Zpi_{B51}'=Zpi_{B51}-Z_{B51change}$, wherein $Z_{B51change}=Zi_{B51}-Zpi_{B51}$. Similarly, the calculate module 503 acquires a second average distance $Zi_{B100}$ of the vertical distances between the fork and the horizontal upper surface at the same waypoint Pi in the place path of the 100$^{th}$ wafer when the upper zone $Z_B$ is unloaded and loaded, the second average distance can be represented as $Zi_{B100}=(Zi_{B100unload}+Zi_{B100load})/2$. The correct module 504 corrects the initial robot teaching data $Zpi_{B100}$ to be $Zpi_{B100}'=Zpi_{B100}-Z_{B100change}$, wherein $Z_{B100change}=Zi_{B100}-Zpi_{B100}$. The store module 502 stores the corrected initial robot teaching data $Zpi_{B51}'$ and $Zpi_{B100}'$.

Figure 10A:
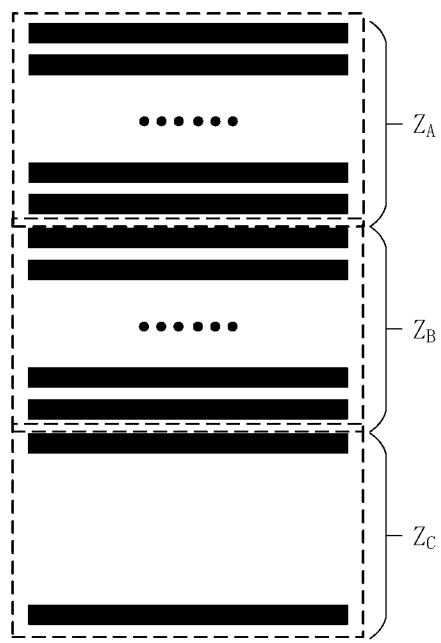
FIGS. 10a and 10b are views illustrating offline obtaining robot teaching data associated with waypoints of wafer pick-up operation paths in the lower zone of the wafer carrier according to another embodiment of the present invention.
Figure 10B:
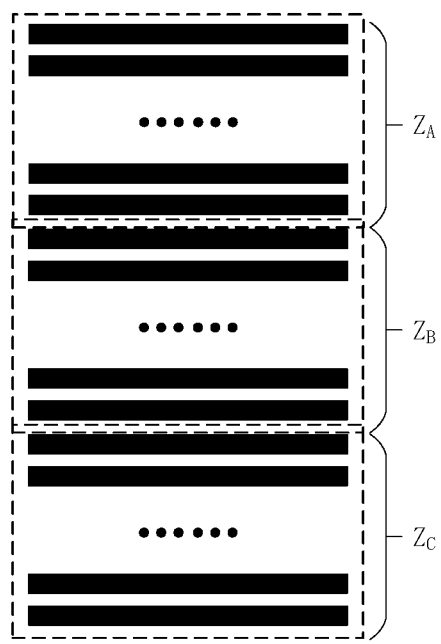

Finally, the initial positions of the waypoints in the place paths of the lower zone $Z_C$ are calibrated. As shown in FIG. 10a, when the upper zone $Z_A$ and the middle zone $Z_B$ are loaded while the lower zone $Z_C$ is unloaded, the drive module 503 drives the robot to move along the place path of the 101$^{st}$ wafer, and drives the lower sensors to detect distances to the detection point at waypoint Pi. The calculate module 505 calculates the vertical distance $Zi_{C101unload}$ between the fork and the horizontal upper surface accordingly. Then the drive module 503 drives the robot to move along the place path of the 150$^{th}$ wafer, and drives the lower sensors to detect distances to the detection point at waypoint Pi. The calculate module 505 calculates the vertical distance $Zi_{C150unload}$ between the fork and the horizontal upper surface accordingly. As shown in FIG. 10b, when all the three zones are loaded, the drive module 503 again drives the robot to move along the place paths of the 101$^{st}$ wafer and the 150$^{th}$ wafer, the calculate module 505 respectively calculates the vertical distances between the fork and the horizontal upper surface at waypoint Pi in the place path of the 101$^{st}$ wafer and the 150$^{th}$ wafer as $Zi_{C101load}$ and $Zi_{C150load}$ according to detection results of the lower sensors. Then, the calculate module 505 acquires a first average distance $Zi_{C101}$ of the vertical distances between the fork and the horizontal upper surface at the same waypoint Pi in the place path of the 101$^{st}$ wafer when the upper zone $Z_C$ is unloaded and loaded, the first average distance $Zi_{C101}$ can be represented as $Zi_{C101}=(Zi_{C101unload}+Zi_{C101load})/2$. The correct module 504 corrects the initial robot teaching data $Zpi_{C101}$ to be $Zpi_{C101}$ wherein $Z_{C101change}=Zi_{C101}-Zpi_{C101}$. Similarly, the calculate module 505 acquires a second average distance $Zi_{C150}$ of the distances between the fork and the horizontal upper surface at the same waypoint Pi in the place path of the 150$^{th}$ wafer when the upper zone $Z_C$ is unloaded and loaded, the second average distance $Zi_{C150}$ can be represented as $Zi_{C150}=(Zi_{C150unload}+Zi_{C150load})/2$. The correct module 504 corrects the initial robot teaching data $Zpi_{C150}$ to be $Zpi_{C150}'=Zpi_{C150}-Z_{C150change}$, wherein $Z_{C150change}=Zi_{C150}-Zpi_{C150}$. The store module 502 stores the corrected initial robot teaching data $Zpi_{C101}'$ and $Zpi_{C150}'$.

During the above robot teaching data acquisition associated with the wafer place paths, the environmental temperature always keeps the same. The temperature can be in a range from 20° C. to 25° C.

FIGS. 11 to 13 illustrate the robot teaching data acquisition associated with wafer pick-up operation paths.

Figure 11A:
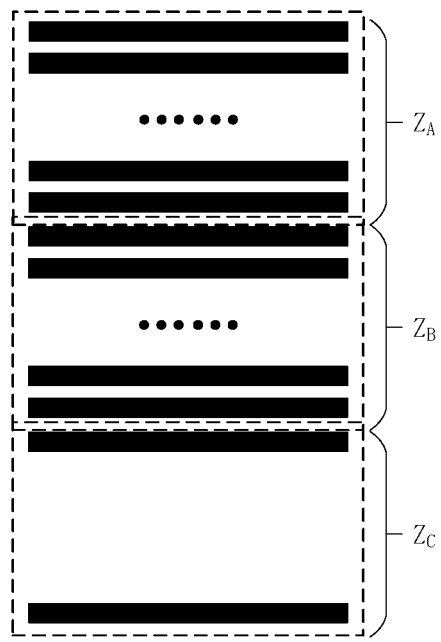
FIGS. 11a and 11b are views illustrating offline obtaining robot teaching data associated with waypoints of wafer place operation paths in the upper zone of the wafer carrier according to another embodiment of the present invention.
Figure 11B:
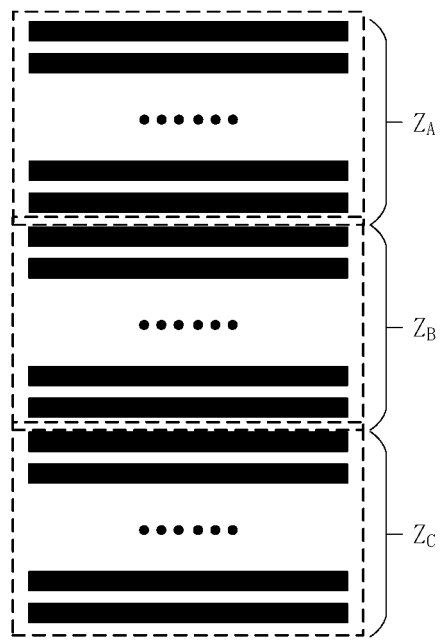

Please referring to FIG. 11a, the initial positions of the waypoints in the pick-up paths of the lower zone are firstly calibrated. Specifically, when the lower zone $Z_C$ is unloaded and the upper zone $Z_A$ and the middle zone $Z_B$ are loaded, the drive module 503 drives the robot to move along the pick-up path of the $101^{st}$ wafer, and drives the lower sensors to detect distances to the detection point at waypoint Pi. The calculate module 505 calculates the vertical distance $Zi'_{C101unload}$ between the fork and the horizontal upper surface accordingly. Then the drive module 504 drives the robot to move along the pick-up path of the $150^{th}$ wafer, and drives the lower sensors to detect distances to the detection point at waypoint Pi. The calculate module 505 calculates the vertical distance $Zi'_{C150unload}$ between the fork and the horizontal upper surface accordingly. As shown in FIG. 11b, when all the three zones are loaded, the drive module 503 again drives the robot to move along the pick-up path of the $101^{st}$ wafer and the $150^{th}$ wafer, the calculate module 505 respectively calculates the vertical distances between the fork and the horizontal upper surface at waypoint Pi in the pick-up paths of the $101^{st}$ wafer and the $150^{th}$ wafer as $Zi'_{C101load}$ and $Zi'_{C150load}$ according to detection results of the lower sensors. Then, the calculate module 505 acquires a first average distance $Zi'_{C101}$ of the vertical distances between the fork and the horizontal upper surface at the same waypoint Pi in the pick-up path of the $101^{st}$ wafer when the upper zone $Z_C$ is unloaded and loaded, the first average distance can be represented as $Zi'_{C101}=(Zi'_{C101unload}+Zi'_{C101load})/2$. The calculate module 505 also acquires a second average distance $Zi'_{C150}$ of the vertical distances between the fork and the horizontal upper surface at the same waypoint Pi in the pick-up path of the $150^{th}$ wafer when the upper zone $Z_C$ is unloaded and loaded, the second average distance can be represented as $Zi'_{C150}=(Zi'_{C150unload}+Zi'_{C150load})/2$. The correct module 504 corrects the initial robot teaching data associated with the pick-up operation paths of the $101^{st}$ wafer and the $150^{th}$ wafer respectively according to the first average distance and the second average distance. The store module 506 stores the corrected initial robot teaching data.

Figure 12A:
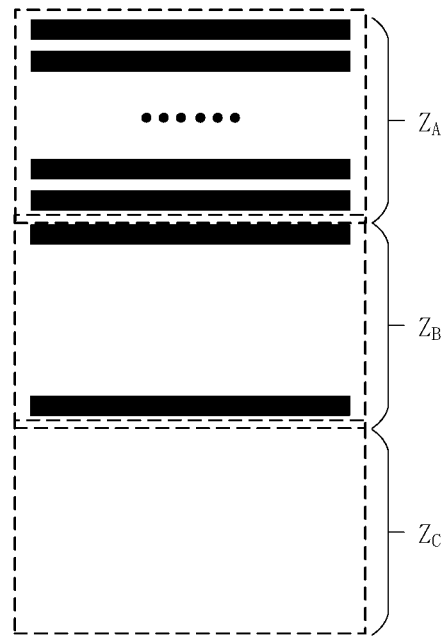
FIGS. 12a and 12b are views illustrating offline obtaining robot teaching data associated with waypoints of wafer place operation paths in the middle zone of the wafer carrier according to another embodiment of the present invention.
Figure 12B:
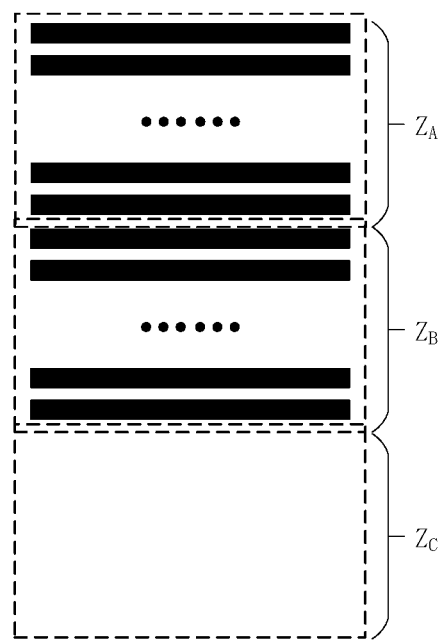

Then the initial positions of the waypoints in the pick-up paths of the middle zone $Z_B$ are calibrated. As shown in FIG. 12a, when the upper zone $Z_A$ is loaded, the middle zone $Z_B$ is unloaded and the lower zone $Z_C$ is empty, the drive module 503 drives the robot to move along the pick-up path of the $51^{st}$ wafer, and drives the lower sensors to detect distances to the detection point at waypoint Pi. The calculate module 505 calculates the vertical distance $Zi'_{B51unload}$ between the fork and the horizontal upper surface accordingly. Then the drive module 503 drives the robot to move along the pick-up path of the $100^{th}$ wafer, and drives the lower sensors to detect distances to the detection point at waypoint Pi. The calculate module 505 calculates the vertical distance $Zi'_{B100unload}$ between the fork and the horizontal upper surface accordingly. As shown in FIG. 12b, when the upper zone $Z_A$ and the middle zone $Z_B$ are loaded while the lower zone $Z_C$ is empty, the drive module 503 again drives the robot to move along the pick-up paths of the $51^{st}$ wafer and the $100^{th}$ wafer, the calculate module respectively calculates the vertical distances between the fork and the horizontal upper surface at waypoint Pi in the pick-up paths of the $51^{st}$ wafer and the $100^{th}$ wafer as $Zi'_{B51load}$ and $Zi'_{B100load}$ according to detection results of the lower sensors. Then, the calculate module 505 acquires a first average distance $Zi'_{B51}$ of the vertical distances between the fork and the horizontal upper surface at the same waypoint Pi in the pick-up path of the $51^{st}$ wafer when the upper zone $Z_B$ is unloaded and loaded, the first average distance can be represented as $Zi'_{B51}=(Zi'_{B51unload}+Zi'_{B51load})/2$. The calculate module 505 also acquires a second average distance $Zi'_{B100}$ of the distances between the fork and the horizontal upper surface at the same waypoint Pi in the pick-up path of the $100^{th}$ wafer when the upper zone $Z_B$ is unloaded and loaded, the second average value can be represented as $Zi'_{B100}=(Zi'_{B100unload}+Zi'_{B100load})/2$. The correct module 504 corrects the initial robot teaching data associated with the pick-up operation paths of the $51^{st}$ wafer and the $100^{th}$ wafer respectively according to the first average distance and the second average distance. The store module 506 stores the corrected initial robot teaching data.

Figure 13A:
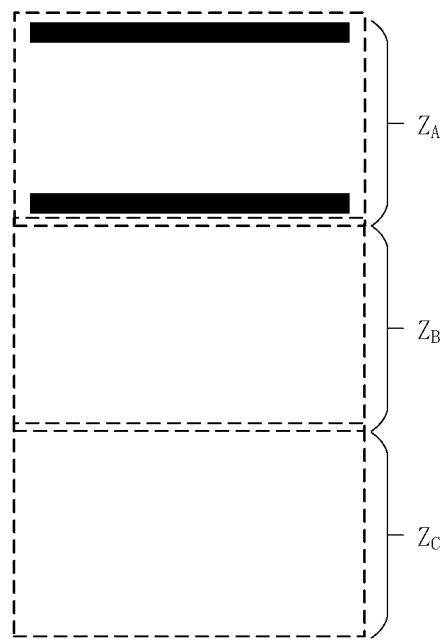
FIGS. 13a and 13b are views illustrating offline obtaining robot teaching data associated with waypoints of wafer place operation paths in the lower zone of the wafer carrier according to another embodiment of the present invention.
Figure 13B:
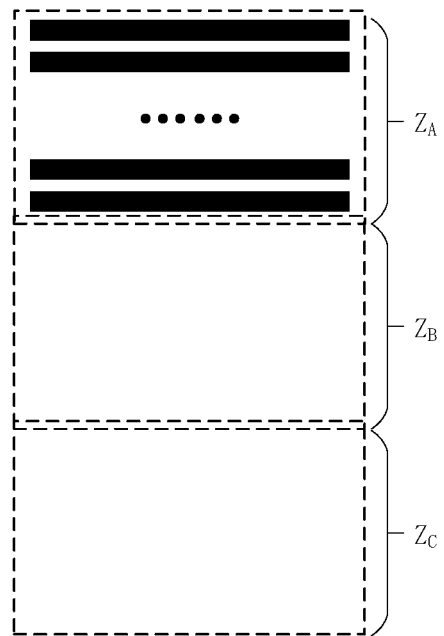

Finally, the initial positions of the waypoints in the pick-up paths of the upper zone are firstly calibrated. As shown in FIG. 13a, when the upper zone $Z_A$ is unloaded and the middle and lower zones $Z_B$, $Z_C$ are empty, the drive module 503 drives the robot to move along the pick-up path of the $1^{st}$ wafer, and drives the lower sensors to detect distances to the detection point at waypoint Pi. The calculate module 505 calculates the vertical distance $Zi'_{A1unload}$ between the fork and the horizontal upper surface accordingly. Then the drive module 503 drives the robot to move along the pick-up path of the $50^{th}$ wafer, and drives the lower sensors to detect distances to the detection point at waypoint Pi. The calculate module 505 calculates the vertical distance $Zi'_{A50unload}$ between the fork and the horizontal upper surface accordingly. As shown in FIG. 13b, when the upper zone $Z_A$ is loaded while the middle and lower zones $Z_B$, $Z_C$ are empty, the drive module 503 again drives the robot to move along the pick-up paths of the $1^{st}$ wafer and the $50^{th}$ wafer, the calculate module 505 respectively calculates the vertical distances between the fork and the horizontal upper surface at waypoint Pi in the pick-up paths of the $1^{st}$ wafer and the $50^{th}$ wafer as $Zi'_{A1load}$ and $Zi'_{A50load}$ according to detection results of the lower sensors. Then, the calculate module 505 acquires a first average distance $Zi'_{A1}$ of the vertical distances between the fork and the horizontal upper surface at the same waypoint Pi in the pick-up path of the $1^{st}$ wafer when the upper zone $Z_A$ is unloaded and loaded, the first average distance can be represented as $Zi'_{A1}=(Zi'_{A1unload}+Zi'_{A1load})/2$. The calculate module also acquires a second average distance $Zi'_{A50}$ of the vertical distances between the fork and the horizontal upper surface at the same waypoint Pi in the pick-up path of the $50^{th}$ wafer when the upper zone $Z_A$ is unloaded and loaded, the second average value can be represented as $Zi'_{A50}=(Zi'_{A50unload}+Zi'_{A50load})/2$. The correct module 504 corrects the initial robot teaching data associated with the pick-up operation paths of the $1^{st}$ wafer and the $50^{th}$ wafer respectively according to the first average distance and the second average distance. The store module 506 stores the corrected initial robot teaching data.

During the above robot teaching data acquisition associated with the wafer pick-up operation paths, the environmental temperature always keeps the same, e.g. at 50° C. The temperature can be in a range from 40° C. to 80° C.

After obtaining the robot teaching data of the waypoints in the key operation paths as mentioned above, the position parameters of the waypoints in other operation paths can be calculated accordingly. Then, these robot teaching data can be corrected on-line during the actual wafer pick-and-place operations or offline before the actual wafer pick-and-place operations, so as to ensure safe wafer handling.

While the invention has been particularly shown and described with references to preferred embodiments thereof, if will be understood by those skilled in the art that various changes in form and details may be made herein without departing from the spirit and scope of the invention as defined by the appended claims.

The invention claimed is:

1. A robot teaching position correcting method, wherein the robot comprises a fork mounted on a fixed base station for picking up and placing target wafers on supporters of a wafer carrier, the correcting method comprises:
   Step S1: offline obtaining robot teaching data including position parameters of a sequence of waypoints which define pick-up operation paths or place operation paths of the target wafers;
   Step S2: providing at least three non-linear arranged upper sensors on a top surface of the fork or a top surface of a dummy wafer fixed on the fork;
   Step S3: driving the robot to move along the pick-up operation path or the place operation path of each target wafer, and at each waypoint driving the upper sensors to detect distances between the waypoint and an adjacent supporter above the waypoint;
   Step S4: at each waypoint, correcting a position parameter of the waypoint according to the distances detected by the upper sensors.

2. The correcting method according to claim 1, wherein the position parameters of each waypoint includes a reference vertical distance between the waypoint and a horizontal plane of the adjacent supporters above the waypoint, wherein Step S4 further comprises:
   at each waypoint, calculating vertical distances between the upper sensors and the horizontal plane of the adjacent supporters above the waypoint;
   calculating an average value of the vertical distances;
   calculating a variation between the average value and the reference vertical distance;
   correcting the position parameter of the waypoint according to the variation.

3. The correcting method according to claim 1, wherein Step S1 further comprises:
   S11: setting a detection point on a horizontal upper surface of the base station and establishing a reference coordinate system in which the detection point is a zero point, the horizontal upper surface is an XOY plane;
   Step S12: providing at least one lower sensor on a bottom surface of the fork or at uncovered regions on a bottom surface of the dummy wafer for detecting a distance to the detection point;
   Step S13: setting initial robot teaching data at least including coordinate values of the waypoints in the reference coordinate system which define pick-up operation paths and place operation paths for a top wafer and a bottom wafer in the wafer carrier;
   Step S14: actuating the robot to move in accordance with the initial robot teaching data and driving the lower sensor to detect a distance to the detection point at least when the robot arrives at each waypoint;
   Step S15: obtaining a vertical distance between the fork and the horizontal upper surface at each waypoint according to a detection result from the lower sensor;
   Step S16: correcting the coordinate values of the waypoints in the reference coordinate system according to the vertical distance between the fork and the horizontal upper surface to obtain the robot teaching data.

4. The correcting method according to claim 1, wherein in Step S1 when offline obtaining the position parameters of the waypoints in the pick-up operation paths and the place operation paths for the top wafer, only a top location of the wafer carrier is loaded with the top wafer; when offline obtaining the position parameters of the waypoints in the pick-up operation paths and the place operation paths for the bottom wafer, all locations in the wafer carrier are loaded with wafers.

5. The correcting method according to claim 1, wherein Step S1 further comprises:
   Step S11': setting a detection point on a horizontal upper surface of the base station and establishing a reference coordinate system in which the detection point is a zero point, the horizontal upper surface is an XOY plane;
   Step S12': providing at least one lower sensor on a bottom surface of the fork or at uncovered regions on a bottom surface of the dummy wafer for detecting a distance to the detection point;
   Step S13': dividing the wafer carrier into multiple zones from top to bottom;
   Step S14': setting initial robot teaching data at least including coordinate values of the waypoints in the reference coordinate system which define pick-up operation paths and place operation paths for a top wafer and a bottom wafer in each zone of the wafer carrier;
   Step S15': actuating the robot to move in accordance with the initial robot teaching data when the multiple zones are unloaded and/or full-loaded; detecting a distance to the detection point by the lower sensor at least when the robot arrives at each waypoint in the pick-up operation paths and place operation paths for the top wafer and the bottom wafer in each zone; obtaining a vertical distance between the fork and the horizontal upper surface at each waypoint according to a detection result from the lower sensor; and correcting the coordinate values of the waypoints in the reference coordinate system according to the vertical distances between the fork and the horizontal upper surface to obtain the robot teaching data.

6. The correcting method according to claim 5, wherein the step S15' further comprises:
   actuating the robot to move along the place operation paths of the top wafer and the bottom wafer in a current zone when the current zone and an above zone are full-loaded and obtaining the vertical distance between the fork and the horizontal upper surface by the lower sensor once the robot arrives at each waypoint;
   actuating the robot to move along the place operation paths of the top wafer and the bottom wafer in the current zone when the current zone is unloaded while the above zone is full-loaded and obtaining the vertical distance between the fork and the horizontal upper surface by the lower sensor once the robot arrives at each waypoint;
   calculating an average distance of the vertical distances between the fork and the horizontal upper surface at the same waypoint when the current zone is loaded and unloaded;
   correcting the coordinate values of the waypoints in the place paths for the top wafer and the bottom wafer in the current zone according to the average distance.

7. The correcting method according to claim 5, wherein the step S15' further comprises:
   actuating the robot to move along the pick-up operation paths of the top wafer and the bottom wafer in a current zone when the current zone is unloaded and an underlying zone is empty, and obtaining a vertical distance between the fork and the horizontal upper surface by the lower sensor once the robot arrives at each waypoint;

actuating the robot to move along the pick-up operation paths of the top wafer and the bottom wafer in the current zone when the current zone is loaded and the underlying zone is empty, and obtaining a vertical distance between the fork and the horizontal upper surface by the lower sensor once the robot arrives at each waypoint;

calculating an average distance of the vertical distances between the fork and the horizontal upper surface at the same waypoint when the current zone is loaded and unloaded;

correcting the coordinate values of the waypoints in the pick-up paths for the top wafer and the bottom wafer in the current zone according to the average distance.

8. The correcting method according to claim 5, wherein in the step S15', when actuating the robot to move along the place operation paths of the top wafers and the bottom wafers in the multiple zones, the temperature in the multiple zones keeps consistent; when actuating the robot to move along the pick-up paths for the top wafers and the bottoms in the multiple zones, the temperature in the multiple zones keeps consistent.

9. The correcting method according to claim 5, wherein the at least three upper sensors are fixed on the top surface of the fork uncovered by the target wafer; wherein the correcting method is applied in wafer pick-and-place operations and further comprises:

calibrating a height of the fork while correcting the robot teaching data; and actuating the robot to continue the wafer pick-and-place operations according to the corrected robot teaching data.

10. A robot teaching position correcting system, wherein the robot comprises a fork mounted on a fixed base station for picking up and placing target wafers on supporters in a wafer carrier, the correcting system comprises:

at least three non-linear arranged upper sensors provided on a top surface of the fork or a top surface of a dummy wafer fixed on the fork;

a store module storing robot teaching data including position parameters of a sequence of waypoints which define pick-up operation paths or place operation paths of the target wafers;

a drive module driving the robot to move along the pick-up operation path or the place operation path of each target wafer and at each waypoint driving the upper sensors to detect distances between the waypoint and an adjacent supporter above the waypoint;

a correct module correcting the position parameters of the waypoints according to the distances detected by the upper sensors.

11. The correcting system according to claim 10, wherein the position parameters of each waypoint includes a reference vertical distance between the waypoint and a horizontal plane of the adjacent supporters above the waypoint; the correcting system further comprises a calculate module which at each waypoint calculating vertical distances between the upper sensors and a horizontal plane of the adjacent supporters above the waypoint; calculating an average value of the vertical distances; and calculating a variation between the average value and the reference vertical distance;

wherein the correct module corrects the position parameters of the waypoint according to the variation.

12. The correcting system according to claim 10, further comprises:

at least one lower sensor provided on a bottom surface of the fork or at uncovered regions on a bottom surface of the dummy wafer for detecting a distance to a detection point set on a horizontal upper surface of the base station;

a set module setting initial robot teaching data at least including coordinate values of the waypoints in a reference coordinate system which define pick-up operation paths and place operation paths for a top wafer and a bottom wafer in the wafer carrier, wherein the reference coordinate system is defined that the detection point is a zero point and the horizontal upper surface is an XOY plane;

wherein the drive module actuates the robot to move according to the initial robot teaching data and drives the lower sensor to detect at least when the robot arrives at each waypoint in the pick-up operation paths and the place operation paths for the top wafer and the bottom wafer;

the calculate module calculates a vertical distance between the fork and the horizontal upper surface at each waypoint according to a detection result from the lower sensor;

the correct module corrects the coordinate values of the waypoints in the reference coordinate system according to the vertical distance between the fork and the horizontal upper surface at each waypoint;

the store module stores corrected initial robot teaching data as the robot teaching data.

13. The correcting system according to claim 12, wherein the correct module corrects the coordinate values of the waypoint according to a difference value between the vertical distance from the fork to the horizontal upper surface at the waypoint and a Z position of the waypoint in the reference coordinate system.

14. The correcting system according to claim 12, wherein the initial robot teaching data comprises the coordinate values of the waypoints in the reference coordinate system which define pick-up operation paths and place operation paths for the top wafer and the bottom wafer in the wafer carrier;

when the correct module corrects the coordinate values of the waypoints in the pick-up operation paths and the place operation paths for the top wafer, only a top location of the wafer carrier is loaded with the top wafer; when the correct module corrects the coordinate values of the waypoints in the pick-up operation paths and the place operation paths for the bottom wafer, all locations in the wafer carrier are loaded with wafers.

15. The correcting system according to claim 12, wherein the wafer carrier is divided into multiple zones from top to bottom; the set module sets the initial robot teaching data including the coordinate values of the waypoints in the reference coordinate system which define pick-up operation paths and place operation paths for a top wafer and a bottom wafer in each zone of the wafer carrier; the drive module actuates the robot to move in accordance with the initial robot teaching data when the multiple zones are unloaded and/or full-loaded; the calculate module calculates a distance between the fork and the horizontal upper surface when the robot arrives at each waypoint in the pick-up operation paths and the place operation paths for the top wafer and the bottom wafer in each zone according to the detection result from the lower sensor; the correct module corrects the coordinate values of the waypoints according to the vertical distances between the fork and the horizontal upper surface to obtain the robot teaching data.

16. The correcting system according to claim 15, wherein the drive module actuates the robot to move along the place operation paths of the top wafer and the bottom wafer in a current zone when the current zone and an above zone are full-loaded and drives the lower sensor to detect the distance to the horizontal upper surface once the robot arrives at each waypoint;

the drive module actuates the robot to move along the place operation paths of the top wafer and the bottom wafer in the current zone when the current zone is unloaded while the above zone is full-loaded and drives the lower sensor to detect the distance to the horizontal upper surface once the robot arrives at each waypoint;

the calculate module calculates an average distance of the vertical distances between the fork and the horizontal upper surface at the same waypoint when the current zone is loaded and unloaded according to the detection results from the lower sensor;

the correct module corrects the coordinate values of each waypoint in the place paths for the top wafer and the bottom wafer in the current zone according to the average distance.

17. The correcting system according to claim 15, wherein the drive module actuates the robot to move along the pick-up operation paths of the top wafer and the bottom wafer in a current zone when the current zone is unloaded and an underlying zone is empty, and drives the lower sensor to detect the distance to the horizontal upper surface once the robot arrives at each waypoint;

the drive module actuates the robot to move along the pick-up operation paths of the top wafer and the bottom wafer in the current zone when the current zone is loaded and the underlying zone is empty, and drives the lower sensor to detect the distance to the horizontal upper surface once the robot arrives at each waypoint;

the calculate module calculates an average distance of the vertical distances between the fork and the horizontal upper surface at the same waypoint when the current zone is loaded and unloaded according to the detection results from the lower sensor;

the correct module corrects the coordinate values of each waypoint in the pick-up paths for the top wafer and the bottom wafer in the current zone according to the average distance.

18. The correcting system according to claim 12, wherein when the drive module actuates the robot to move along the place operation paths of the top wafers and the bottom wafers in the multiple zones, the temperature in the multiple zones keeps consistent; when the drive module actuates the robot to move along the pick-up operation paths of the top wafers and the bottom wafers in the multiple zones, the temperature in the multiple zones keeps consistent.

19. The correcting system according to claim 10, wherein the at least three upper sensors are fixed on the top surface of the fork uncovered by the target wafer; the correcting system corrects the robot teaching data on-line during wafer pick-and-place operations.

* * * * *